United States Patent [19]

Thompson

[11] 4,440,874

[45] Apr. 3, 1984

[54] CATALYST COMPOSITION AND METHOD FOR ITS MANUFACTURE

[75] Inventor: Charles E. Thompson, Warren, N.J.

[73] Assignee: Engelhard Corporation, Iselin, N.J.

[21] Appl. No.: 368,185

[22] Filed: Apr. 14, 1982

[51] Int. Cl.$^3$ .................. B01J 21/04; B01J 23/58; B01J 23/78

[52] U.S. Cl. .................. 502/327; 502/328; 423/213.5

[58] Field of Search .................. 252/466 B, 473; 423/213.5; 502/327, 328

[56] References Cited

U.S. PATENT DOCUMENTS

| | | | |
|---|---|---|---|
| 3,751,512 | 8/1973 | Woskow et al. | 252/473 X |
| 3,919,120 | 11/1975 | Kato et al. | 252/466 B |
| 4,048,098 | 9/1977 | Koberstein et al. | 252/466 B |
| 4,157,316 | 6/1979 | Thompson et al. | 252/466 B |
| 4,171,287 | 10/1979 | Keith | 252/466 B |

*Primary Examiner*—W. J. Shine

[57] ABSTRACT

A catalyst composition well suited for oxidation, reduction and oxidation-reduction reactions comprises a platinum group metal component, an oxide composite, and a refractory metal oxide support. The oxide composite comprises at least one member selected from a first group consisting of iron, cobalt and nickel plus at least one member selected from a second group consisting of alkaline earth metals, aluminum and titanium, with the metals of the oxide composite present in proportions such that the atomic ratio of the total of the member or members of said first group to the member or members of said second group is from 1:1 to 10:1.

15 Claims, No Drawings

CATALYST COMPOSITION AND METHOD FOR ITS MANUFACTURE

BACKGROUND OF THE INVENTION

The present invention relates to catalyst compositions and methods for their preparation and more particularly relates to a catalyst composition characterized by good activity for both oxidation and reduction reactions, and one which is particularly well suited for use as a catalyst for the purification of gases, including internal combustion engine exhaust gases.

Catalyst compositions containing a platinum group metal as a component thereof and capable of catalyzing oxidation and/or reduction reactions are of course well known in the art as shown by, for example, U.S. Pat. Nos. 3,565,830, 4,157,316 and 4,171,287, all assigned to the assignee of this application.

U.S. Pat. No. 3,565,830 discloses a catalyst composition having a platinum group metal dispersed on a film of catalytically active metal oxide, such as gamma alumina, and supported on an inert, substantially catalytically inactive refractory support. Platinum and palladium are disclosed as the preferred platinum group metals and the substantially catalytically inert support is disclosed as comprising either particulate supports, such as alumina pellets, or monolithic bodies (made of porous, refractory materials such as cordierite or of oxidation and corrosion resistant metals such as stainless steels) having a plurality of small gas flow channels passing therethrough.

U.S. Pat. No. 4,157,316 discloses a polyfunctional, so-called "three way conversion" catalyst, i.e., one capable of efficiently catalyzing the substantially simultaneous oxidation of hydro-carbons and carbon monoxide and the reduction of nitrogen oxides when an appropriate amount of oxygen is provided or maintained in the gas being treated. For example, the operation of an internal combustion engine is controlled to operate at or close to a stoichiometric proportion of air to fuel in order to maintain the oxygen content within a range in which a suitable three way conversion catalyst will promote both oxidation of unburnt hydrocarbons and carbon monoxide (to $H_2O$ and $CO_2$) and a reduction of nitrogen oxides (to $N_2$). The catalyst preferably comprises platinum plus one or more additional platinum group metals selected from rhodium, ruthenium, and iridium, plus one or more oxides of the base nickel, cobalt, iron, manganese and rhenium. This patent also discloses that the alumina on which the catalytic metals are dispersed may contain stabilizing components to stabilize the aluimina coating against high temperature (1000° C.–1200° C.) transition to the low surface area alpha alumina form. Although ceria and mixtures of ceria and other rare earth metal oxides, particularly lanthia, are preferred stabilizers, magnesium oxide is disclosed as one such stabilizer.

As disclosed in the U.S. Pat. No. 4,056,489, also assigned to the assignee of this application, oxides of calcium, barium and strontium are among materials which may also be employed (in specified combination with rare earth metals) as stabilizers for the alumina. The stabilizers are introduced into the alumina by impregnating the alumina with water-soluble compounds of these metals and thereafter calcining the material in air at a temperature of at least 750° C. to form the requisite metal oxides in the alumina lattice. As U.S. Pat. No. 3,993,572 (also assigned to the assignee of this application) shows, other techniques such as co-precipitation of alumina and the stabilizing metal from solution, may be employed.

U.S. Pat. No. 4,171,287 concerns a polyfunctional catalyst comprising a platinum group metal component and a base metal component comprising one or more base metal oxides selected from manganese; iron, cobalt, nickel and rhenium, wherein at least a major amount of these metal oxides is maintained in solid form throughout the manufacture of the catalyst composition. That is, instead of impregnating the alumina or stabilized alumina material with a water-soluble compound of the catalytic base metal and thereafter calcining the thus-impregnated alumina, (as is done with the platinum group metals) the base metal oxide component is introduced as a finely divided, solid particulate. The base metal in fine particulate form is admixed with the alumina into which the catalytic platinum group metal is, or will be, impregnated.

It is also known in the art to utilize certain metal ferrites in catalyst compositions as shown in Japanese patents: (a) 75/03987 (Jan. 16, 1975 of Kanegafuchi Chem. Industry Co., Ltd.); (b) 74/120886 (Nov. 29, 1974 of Kaneho, Ltd.); (c) 74/102590 (Sept. 27, 1974 of Research Inst. for Production Development; (d) 74/84959 (Aug. 15, 1974 of Nippon Electric Co., Ltd.); (e) 74/75461 (July 20, 1974 of Nippon Electric Co., Ltd.); (f) 74/58677 (June 6, 1974 of Research Inst. for Production Development; (g) 81/95336 (Aug. 1, 1981 of Matsushita Electric Industrial Co., Ltd.; and (h) 77/31993 (Mar. 10, 1977 of Kyoto Ceramic Co. Ltd. These patents show, respectively, the following: (a) and (b) use of copper ferrite or cobalt ferrite as a catalyst for reduction of nitrogen oxides in exhaust gases; (c) the use of manganese ferrite for carbon monoxide oxidation in exhaust gases; (d) barium ferrite for purification treatment of automobile exhaust gases; (e) manganese zinc ferrite for treatment of automobile engine exhaust gases; (f) exhaust gas purification by oxidation of carbon monoxide and hydrocarbons using ferrite catalysts; (g) the use of ferrite substances disposed on manganese-zirconium catalyst supports or platinum-palladium calcium aluminate for carbon monoxide removal from combustion heater exhaust gases; (h) the use of ferrite manganese honeycomb catalyst for automobile exhaust gas treatment.

While catalyst compositions described in the above-mentioned U.S. Patents are useful, and some have been commercially highly successful, it is of course always desirable to provide catalysts which have higher conversion efficiencies, longer life, greater resistance to catalyst poisoning and/or are obtainable at lower cost.

SUMMARY OF THE INVENTION

The present invention provides a novel catalyst composition which has been found to be an effective and efficient catalyst, well suited to catalyze reactions such as those utilized in the purification of gases, particularly internal combustion engine exhaust gases.

In accordance with the present invention, there is provided a catalyst composition comprising a refractory metal oxide support; a catalytically effective amount of a platinum group metal component; and a catalytically enhancing amount of an oxide composite comprising oxides of at least one member selected from a first group consisting of iron, cobalt and nickel plus at least one member selected from a second group consisting of alkaline earth metals, aluminum and titanium. (By "catalytically enhancing amount" is meant that a sufficient amount is present to enhance the activity of the catalyst as compared to the otherwise identical catalyst without the oxide composite.)

In a preferred aspect of the invention, the oxide composite comprises oxides of at least one of iron, nickel and cobalt plus at least one of mangesium, calcium, strontium, barium, aluminum and titanium.

The catalyst composition preferably further includes a carrier on which said support, said platinum group metal component and oxide composite are carried, and in such case the platinum group metal component may comprise from about 0.05 to 1.0 weight percent of the catalyst composition, the oxide composite may comprise from about 1 to 20 weight percent of the catalyst composition and the refractory metal oxide support, which is preferably alumina, may comprise from about 0.2 to 25 percent by weight of said catalyst composition for monolith carriers and from about 90 to 99 percent by weight for particulate or bead catalysts.

In one aspect of the invention, the metals of the oxide composite are present in proportions such that the atomic ratio of the total of the member or members of the first group to the total of the member or members of the second group is from 1:1 to 10:1, preferably from 2:1 to 6:1.

In another preferred aspect, the oxide composite comprises at least one of magnesium ferrite, calcium ferrite, strontium ferrite and barium ferrite. Particularly preferred oxide composites are magnesium oxide and iron oxide, and/or magnesium ferrite. The preferred platinum group metal component is one or more of platinum, palladium and rhodium.

In accordance with another aspect of the invention, there is provided a method of manufacturing a catalyst composition having a platinum group metal component, an oxide composite and a refractory metal oxide support. The method comprises the following steps: contacting the support with a liquid in which at least one platinum group metal compound is dispersed to impregnate the support with the platinum group metal compound; combining with the support a finely divided particulate oxide composite comprising oxides of at least one member selected from a first group consisting of iron, cobalt and nickel plus at least one member selected from a second group consisting of alkaline earth metals, aluminum and titanium; and heating the platinum group metal compound-impregnated support sufficiently to convert the platinum group metal compound to the platinum group metal component.

In a preferred aspect, the method further includes the step of depositing the support, the platinum group metal component and the oxide composite onto a carrier.

The method of the invention may include combining finely divided particulate oxide composite with the support and depositing the oxide composite and the support on the carrier, and thereafter impregnating the support, while it is on the carrier, with the platinum group metal compound. Alternatively, the oxide composite may be added to the combined support and liquid, and the resulting combination of platinum group metal compound-impregnated support and oxide composite deposited upon the carrier.

In carrying out the method of the invention, the step of converting the platinum group metal compound to the platinum group metal component may comprise heating the impregnated support sufficiently to decompose the platinum group metal compound to the elemental metal or metal oxide form.

In another aspect of the invention, the oxide composite is in solid form throughout the manufacture of the catalyst composition.

The heating of the support, the platinum group metal component and the oxide composite may be carried out after they have been deposited on the carrier, and the heating may be at a temperature of about 250° C. to 950° C.

DESCRIPTION OF THE PREFERRED EMBODIMENTS

The catalysts of the present invention comprise both a catalytically effective amount of a platinum group metal component and a catalytically enhancing amount of an oxide component. The platinum group metal component is dispersed upon a high surface area refractory metal oxide support in order to enhance its catalytic efficiency, as is known in the art. The catalytic metal components (which term includes the platinum group metal or metals and the oxide composite) and the metal oxide support may be carried upon a carrier structure which may itself be substantially inert catalytically. The carrier may comprise particulate beads or granules or a monolithic body having gas flow passages extending therethrough. The refractory metal oxide support may itself be a somewhat catalytically active material, such as gamma alumina, but the catalytic activity of such materials is relatively insignificant compared to the catalytic activity of the platinum group metal component and the oxide composite, particularly the former.

The platinum group metal component of the present invention preferably comprises platinum or palladium, either alone or in combination with each other or with rhodium. However, any platinum group metal (which is defined here and in the claims as comprising platinum, palladium, rhodium, ruthenium and iridium) or any combination of two or more platinum group metals, may be employed. The platinum group metal component in catalytically effective form may be on the support in the elemental state, as an alloy, particularly as an alloy with the other platinum group metals only, or as an intermetallic or other compound.

Generally, in platinum group metal catalyst compositions, platinum has been the most preferred component of the catalyst and, when used in combination with other platinum group metals, platinum has usually been utilized in an amount greater than the amount of the other platinum group metals employed therewith, often in an amount greater than the total of the other platinum group metals employed. In the present invention, although preferred embodiments comprise platinum or platinum plus rhodium as the platinum group metal component, other preferred embodiments comprise palladium alone or palladium plus rhodium alone as the platinum group metal component. The high activity and general efficiency of the palladium and palladium-rhodium embodiments of the present invention as polyfunctional or oxidation catalysts for treating engine exhaust gases is surprising in view of the absence of platinum.

Any suitable high surface area refractory metal oxide is employable as the metal oxide support. For example, alumina, preferably active or calcined alumina, beryllia, zirconia, magnesia, silica and combinations of metal oxides such as boria-alumina, silica-alumina, etc. may be employed. Generally, the refractory metal oxide is composed predominantly of oxides of one or more of those metals of Groups II, III, and IV of the Periodic Table of Elements having atomic numbers not greater than 40.

However, alumina is the preferred support and, preferably, is used in the form of a stabilized, high surface area alumina. The high surface area aluminas (which include the chi, gamma, eta, kappa, theta and delta forms) are sometimes referred to as transitional aluminas because, when heated to a sufficiently high temperature, about 1000° C. to 1200° C., they will convert to the low surface area alpha phase. Such transformation is often not desired and, as mentioned above, it is well known that certain additives may be employed to stabilize the transitional aluminas against such phase change. Such stabilized transitional aluminas, particularly gamma alumina, are preferred as the refractory metal oxide support.

The platinum group metal component is advantageously applied to the finely divided, particulate refractory metal oxide support by impregnating the support particles with a solution or with a dispersion, such as a colloid or gel, in liquid of a compound of the platinum group metal. Most preferably, an aqueous solution of a water soluble compound of the platinum group metal is contacted with the finely divided particulate alumina support to impregnate the latter with the platinum group metal compound. Any suitable compound may be utilized; rhodium chloride, rhodium nitrate, palladium chloride, $H_2(Pt)(OH)_6$, $H_2PtCl_6$, $Pt(NH_3)_4Cl_2$ and $Pt(NO_3)_2(NH_3)_2$ are typical. Upon calcination, the platinum group metal and/or an oxide or other compound thereof remains upon the alumina support and may be fixed thereon by known techniques such as $H_2S$, hydrazine or other reduction, air calcination, etc. For obvious economic reasons, the quantity of platinum group metal deposited is usually limited to the minimum amount necessary to efficiently accomplish the processes in which the catalyst is to be employed. When two or more platinum group metals are employed in the catalyst, it may be feasible to provide compounds of the two or more platinum group metals in the same liquid and to contact the support with one liquid containing two or more platinum group metal compounds. Alternatively, the alumina support may be sequentially contacted with a liquid containing one or more platinum group metal compounds followed by another liquid containing one or more other platinum group metal compounds, and so on.

The catalysts of the invention contain an oxide composite of oxides of at least two metals, one of iron, cobalt and nickel and one of an alkaline earth metal, aluminum and titanium. Beryllium and radium, being poisonous and, in the case of the latter, radioactive, are not preferred for use in the catalysts of the invention. Barium, although utilizable, may under certain circumstances poison the platinum group metal component of the invention, and to this extent is less preferred. The oxide composite is, in accordance with the invention, utilized in finely divided, particulate, solid form and as such is mixed with the finely divided particulate solid support, e.g., alumina or stabilized alumina. The oxide composite may be utilized in the catalyst as a mixture of oxides of the metals, as a mineral or compound, such as a ferrite, containing the metals, or as a mixture of the foregoing.

The solid oxide composite of the present invention is in substantially water insoluble form when added to the refractory metal oxide support so that it is dispersed among the metal oxide support particles as a separate component of the catalyst composition. The oxide composite is not, for example, incorporated into the crystal lattice of an alumina support in the manner of a compound used to stabilize alumina against transition to the alpha form. As shown in U.S. Pat. No. 4,157,316, at column 4, line 20 et. seq. thereof, it is known to utilize one or more of a number of different materials, including titania, zirconia, silica, magnesia, strontium oxide, calcium oxide and rare earth metal oxides (e.g., ceria, lanthia and mixtures thereof) as a stabilizing component of alumina. This is attained either by co-precipitation of such compounds with alumina from a solution or by impregnation of the alumina with a water soluble compound of the selected metal, followed by calcination in air to form the selected metal oxide in the alumina lattice. In contrast, in the present invention, the oxide composite is combined as a substantially water insoluble solid with the other ingredients, including the refractory metal oxide support, as a separate component of the composition. For example, although one embodiment of the present invention may comprise an alumina support stabilized with, e.g., magnesia, the magnesium oxide stabilizer does not provide the oxide composite required by the present invention. The oxide composite herein is a separate component which may include magnesia, titania, calcium oxide, e.g., in the form of magnesium ferrite and/or as a mixture of iron oxide and magnesium oxide particles, separate and apart from, e.g., any magnesia, titania or calcia which may be incorporated in the alumina lattice as a stabilizer for the alumina support.

As indicated above, in one embodiment of the invention the oxide composite is provided at least partially in form of an alkaline earth metal ferrite. For example, magnesium oxide may be prepared by calcining $Mg(NO_3)_2 \cdot 6H_2O$ in air, at a temperature of about 500° C. Equimolar amounts of the magnesia thus obtained and $Fe_3O_4$ may be ground to a fine powder in a mortar and pestle and the resulting particulate mass calcined in air for six hours at 600° C. and then for an additional six hours at 800° C. The resulting material, as examined by x-ray diffraction, disclosed the presence of a substantial amount of magnesium ferrite—$Mg(FeO_2)_2$. The resultant material (not just the magnesium ferrite portion) may be utilized as described below in the preparation of catalyst compositions in accordance with the present invention. Spinel forms of the ferrite are preferred; accordingly, those alkaline earth metals, such as magnesium, which are capable of forming spinels, are to that extent preferred. The general formula for a spinel is $AB_2O_4$ and the spinel form of magnesium ferrite would therefore be represented by the formula $MgFe_2O_4$.

Magnesium ferrite is also available commercially, or may be synthesized by methods known to the art and reported in the literature. For example, both a co-precipitation synthesis technique wherein magnesium hydroxide and iron hydroxide are co-precipitated from solution, and a synthesis via metal oxalates are known, and have been utilized to provide magnesium ferrites.

Reference in this application and the claims to an "oxide composite" of oxides of various metals does not require, nor does it rule out, that each metal of the oxide composite be present as the oxide. Thus, an oxide composite of the invention may comprise, in lieu of or in additional to a mixture of simple oxides, a "complex oxide." This latter term is used herein and in the claims to mean a compound or other composition of fixed proportions containing at least two metals (at least one from each of the first and second groups of metals of the oxide composite of the invention) wherein at least one of the two metals is present as an oxide. For example, magnesium ferrite is considered to be such a complex oxide; the conventional formula notation for magnesium ferrite is $Mg(FeO_2)_2$, which suggests that the magnesium, although chemically bound or otherwise fixed in the composition, is not present as an oxide, whereas the iron is. Thus, the term "oxide composite" is intended to include, without limitation, synthetic and naturally occurring minerals, ores, etc. as well as true chemical compounds and mixtures of any of the foregoing. The oxide composite may be prepared from its individual constituents or a suitable synthetic or naturally occurring mineral may be employed. As an example of the latter, one of the exemplary catalyst compositions described below uses ilmenite as the oxide composite. The nominal composition of ilmenite is $FeO \cdot TiO_2$, it sometimes occurs with some replacement of the iron by magnesium or manganese, and contains small amounts of other materials, which is acceptable in the invention.

Most of the examples given below utilize iron oxide as the component selected from the group of oxides of iron, nickel or cobalt. Preferably the metal is iron or nickel. Most preferably it is iron.

An exemplary mode of preparation of a catalyst composition in accordance with the present invention is set forth in the following example.

EXAMPLE

A ceria stabilized alumina, comprising predominantly gamma alumina, comprises about 5% by weight ceria, balance alumina and is ground to an average particle size of about 8 microns diameter. The stabilized alumina is mixed in a blender with 2,800 cc of a 55% aqueous solution of hydrazine hydrate and 1,157.4 g of palladium as $Pd(NO_3)_2$. The materials are blended to impregnate the stabilized alumina particles with the palladium compound, which is reduced to metal on the alumina particles by the hydrazine hydrate. The resulting palladium-impregnated stabilized alumina is then added to a ball mill, together with a base metal component obtained as follows. A mixture of 24,291 g of $Fe_3O_4$ and 5,709 g of MgO is ground to an average particle size of not more than about 10 microns and the resulting pulverant mixture is calcined in air at 600° C. for six hours and for an additional six hours at 800° C. to provide a material containing at least a significant proportion of magnesium ferrite therein. The magnesium ferrite-containing material is ground in the ball mill together with the palladium impregnated alumina together with 11,165 cc of glacial acetic acid and 609 cc of 1-octanol. The material is ground in the ball mill until an average particle size of approximately 5 microns is obtained. The resulting material is then coated onto a cordierite honeycomb having 400 gas flow channels per square inch of face area (C-400 substrate, manufactured by Corning) and the coated monolith is dried and calcined in air at 450° C. An effective polyfunctional catalyst results, one which is capable of successfully catalyzing substantially simultaneous oxidation of the hydrocarbon and carbon monoxide components of an automobile engine exhaust gas, while catalyzing the reduction of the nitrogen oxide component of the exhaust gas.

A series of catalyst compositions in accordance with the present invention and comparison compositions were prepared by the procedure described in the example. Each of the below described materials is a monolithic catalyst composition in which the honeycomb carrier is a C-400 cordierite carrier (400 gas flow passages per square inch of end face area) manufactured by Corning. The monolith carrier in each case is a laboratory cylindrical core measuring 1½ inches (3.81 cm) in diameter and three inches (7.62 cm) in length. The amount of platinum group metal on the catalyst is given in grams of elemental platinum group metal per cubic foot of monolith, and the amount of base metal component and refractory metal oxide coating is reported in grams per cubic inch of monolith. The base metal component weight is given as the identicated oxide. When more than one platinum group metal is present, the weight ratio of the metals in the order listed is given in parentheses. Thus, catalyst A in Table I contains platinum and rhodium in a weight ratio of ten parts platinum to one part rhodium. In each case, the refractory metal oxide coating is alumina, predominantly comprising gamma alumina. When (ceria) stabilized alumina support coatings were used, the respective weight percents of alumina and ceria stabilizer in the alumina coating is indicated.

TABLE I

| Catalyst | PG Metal Component | PG Metal, g/ft³ | 0.3 g/in³ of Oxide Composite, When Present | 1.75 g/in³ of Alumina Support Coating |
|---|---|---|---|---|
| A | Pt,Rh(10:1) | 35 | NiO | 5% ceria, 95% alumina |
| B | Pt,Rh(10:1) | 35 | $Fe_3O_4$ | 5% ceria, 95% alumina |
| C | Pt,Rh(12:1) | 40 | NiO | 5% ceria, 95% alumina |
| D | Pt,Rh(12:1) | 40 | $MgO \cdot Fe_3O_4$* | 5% ceria, 95% alumina |
| E | Pd | 20 | None | 5% ceria, 95% alumina |
| F | Pd | 20 | $MgO \cdot Fe_3O_4$* | 5% ceria, 95% alumina |
| G | Pd | 20 | None | unstabilized alumina |
| H | Pd | 20 | $MgO \cdot Fe_3O_4$* | unstabilized alumina |
| I | Pd,Rh(5:1) | 20 | $MgO \cdot Fe_3O_4$* | 5% ceria, 95% alumina |
| J | Pd,Rh(5:1) | 20 | None | 5% ceria, 95% alumina |
| K | Pd | 20 | None | 5% ceria, 95% alumina |
| L | Pt,Rh(11:1) | 40 | $MgO \cdot Fe_3O_4$* | 5% ceria, 95% alumina |
| M | " | 40 | $CaO \cdot Fe_3O_4$ | 5% ceria, 95% alumina |
| N | " | 40 | $BaO \cdot Fe_3O_4$ | 5% ceria, 95% alumina |
| O | " | 40 | $TiO_2 \cdot FeO_2$ (ilmenite) | 5% ceria, 95% alumina |
| P | " | 40 | $MgO \cdot Fe_3O_4$* | 5% ceria, 95% alumina |
| Q | " | 40 | $MgO \cdot NiO$ | 5% ceria, 95% alumina |
| R | " | 40 | $Al_2O_3 \cdot Fe_3O_4$ | 5% ceria, 95% alumina |
| S | Pt,Rh(11:1)** | 40 | $2FeO \cdot TiO_2$ | 5% ceria, 95% alumina |
| T | " | 40 | $NiO \cdot Fe_3O_4$ | 5% ceria, 95% alumina |
| U | " | 40 | $FeO \cdot TiO_2$ | 5% ceria, 95% alumina |
| V | " | 40 | $MgO \cdot Fe_3O_4$* | 5% ceria, 95% alumina |
| W | " | 45 | $FeO \cdot MnO \cdot TiO_2$ | 5% ceria, 95% alumina |
| X | " | 40 | $2FeO \cdot TiO_2$ | 5% ceria, 95% alumina |

TABLE I-continued

| Catalyst | PG Metal Component | PG Metal, g/ft³ | 0.3 g/in³ of Oxide Composite, When Present | 1.75 g/in³ of Alumina Support Coating |
|---|---|---|---|---|
| Y | " | 40 | NiO | 5% ceria, 95% alumina |

*Based on a rough estimate attained by examination of x-ray diffraction patterns, about 12% by weight of the MgO.Fe₃O₄ is present as magnesium ferrite, $Mg(FeO_2)_2$.

**About 83 weight percent of the alumina support coating is impregnated with platinum only, and the remaining approximately 17 weight percent is impregnated with rhodium only.

Each of the above catalyst compositions was mounted in the exhaust stream of a laboratory test automobile engine, aged as described below, and then tested for utilization as a polyfunctional or so-called three-way conversion catalyst, i.e., used to catalyze the substantially simultaneous oxidation of carbon monoxide and unburnt hydrocarbons and reduction of nitrogen oxides. Each composition was aged in a variable engine-load aging cycle for the indicated amount of time. In each case, the engine utilized for the aging burned a normal hydrocarbon gasoline fuel with a lead content of 0.012 grams of lead per gallon of fuel. The air-to-fuel stoichiometric ratio for the fuel in question is 14.65. In Tables II–VII below, air-to-fuel ratio "units" are employed, in which the air-to-fuel ratio of 14.65 is taken as a base line of unit zero. Four other points, at +0.1 A/F units (air-to-fuel ratio of 14.75), +0.2 A/F units (air-to-fuel ratio of 14.85), −0.1 A/F units (air-to-fuel ratio of 14.55) and −0.2 A/F units (air-to-fuel ratio of 14.45), were taken. The positive air-to-fuel units correspond to a fuel-lean mixture and the negative units to a fuel-rich mixture. In the evaluation tests, the air-to-fuel ratio employed was fluctuated about the five data points as indicated in Table II.

TABLE II

Evaluation Conditions

| Catalyst | Hours Aged | Temp °C. | Gas Flow Rate (STP)[1] | A/F Ratio Fluctuation at 1.0 Hz Perturbations |
|---|---|---|---|---|
| A,B | 150 | 482 | 80,000 | ±0.5 A/F unit |
| C,D | 150 | 400 | 80,000 | ±1.0 A/F unit |
| E,F | 300 | 400 | 80,000 | ±1.0 A/F unit |
| G,H | 300 | 400 | 80,000 | ±1.0 A/F unit |
| I,J,K | 300 | 400 | 80,000 | ±1.0 A/F unit |
| L-R | 150 | 400 | 86,000 | ±1.0 A/F unit |
| S-Y | 300 | 400 | 80,000 | ±1.0 A/F unit |

[1]Volume of gas per volume of catalyst per hour, at standard temperature and pressure.

After aging, the catalysts, the compositions of which are shown in Table I, were evaluated for catalytic efficiency at the indicated conditions, and the results are summarized in Tables III–VIII below. The following results show the amount of hydrocarbons, carbon monoxide and nitrogen oxides which were converted to, respectively, H₂O, CO₂ and N₂ under the above indicated evaluation conditions. The percentages show that weight percentage of the total contaminant present prior to treatment which was converted by passage through the catalyst composition.

TABLE III

| Catalyst A/F Ratio | A % Conversion | | | B % Conversion | | |
|---|---|---|---|---|---|---|
| Units | HC | CO | NO | HC | CO | NO |
| +0.2 | 94 | 100 | 57 | 95 | 100 | 41 |
| +0.1 | 89 | 98 | 82 | 88 | 99 | 61 |
| 0 | 80 | 81 | 92 | 76 | 88 | 86 |
| −0.1 | 69 | 66 | 93 | 65 | 64 | 85 |
| −0.2 | 57 | 47 | 94 | 44 | 45 | 84 |

TABLE IV

| Catalyst A/F Ratio | C % Conversion | | | D % Conversion | | |
|---|---|---|---|---|---|---|
| Units | HC | CO | NO | HC | CO | NO |
| +0.2 | 91 | 87 | 67 | 95 | 99 | 79 |
| +0.1 | 90 | 79 | 73 | 94 | 99 | 85 |
| 0 | 88 | 70 | 78 | 91 | 96 | 93 |
| −0.1 | 86 | 64 | 86 | 85 | 83 | 92 |
| −0.2 | 78 | 53 | 95 | 79 | 73 | 93 |

TABLE V

| Catalyst A/F Ratio | E % Conversion | | | F % Conversion | | |
|---|---|---|---|---|---|---|
| Units | HC | CO | NO | HC | CO | NO |
| +0.2 | 67 | 50 | 36 | 79 | 57 | 42 |
| +0.1 | 65 | 43 | 38 | 76 | 49 | 44 |
| 0 | 64 | 35 | 42 | 73 | 42 | 45 |
| −0.1 | 59 | 29 | 45 | 70 | 35 | 49 |
| −0.2 | 56 | 23 | 48 | 67 | 28 | 50 |

TABLE VI

| Catalyst A/F Ratio | G % Conversion | | | H % Conversion | | |
|---|---|---|---|---|---|---|
| Units | HC | CO | NO | HC | CO | NO |
| +0.2 | 52 | 45 | 17 | 75 | 53 | 33 |
| +0.1 | 50 | 40 | 20 | 74 | 47 | 34 |
| 0 | 47 | 34 | 22 | 72 | 43 | 35 |
| −0.1 | 44 | 30 | 22 | 68 | 35 | 36 |
| −0.2 | 40 | 24 | 22 | 65 | 31 | 40 |

TABLE VII

| Catalyst A/F Ratio | I % Conversion | | | J % Conversion | | | K % Conversion | | |
|---|---|---|---|---|---|---|---|---|---|
| Units | HC | CO | NO | HC | CO | NO | HC | CO | NO |
| +0.2 | 85 | 83 | 61 | 74 | 64 | 52 | 66 | 50 | 37 |
| +0.1 | 83 | 78 | 65 | 73 | 58 | 55 | 65 | 43 | 38 |
| 0 | 81 | 69 | 72 | 70 | 52 | 60 | 63 | 35 | 42 |
| −0.1 | 76 | 59 | 77 | 68 | 44 | 65 | 59 | 29 | 45 |
| −0.2 | 72 | 44 | 83 | 65 | 37 | 72 | 55 | 23 | 49 |

A comparison of catalysts A and B is set forth in Table III. Both catalysts are polyfunctional platinum-rhodium catalysts. Catalyst A contains nickel oxide as a base metal component and provides somewhat better results for hydrocarbon and nitrogen oxide conversion than does catalyst B, which is an equivalent catalyst except that Fe₃O₄ is substituted for the nickel oxide as the base metal component. The carbon monoxide conversion results obtained with the two materials are comparable.

Table IV shows that catalyst D, a polyfunctional catalyst in accordance with the present invention and comprising a platinum-rhodium catalyst containing as the oxide composite, iron oxide/magnesium oxide, at least a substantial portion of which is present as magnesium ferrite, provides substantially better results for carbon monoxide and nitrogen oxide conversion and slightly better results for hydrocarbon conversion than does catalyst C. Catalyst C is an otherwise equivalent catalyst but with nickel oxide as a base metal component.

As indicated in Table V, catalyst F, which is a palladium and magnesium oxide/iron oxide polyfunctional catalyst composition in accordance with the present invention, provides somewhat better results than otherwise identical catalyst E which contains palladium but no oxide composite. The evaluation data reported in Table V is rendered somewhat atypical due to repeated misfiring of the test engine during the evaluation phase. However, the data nonetheless shows better performance for the embodiment of the invention as compared to a comparable catalyst which lacks any oxide composite or base metal component.

Table VI is another comparison of a palladium catalyst in accordance with the invention, catalyst H, which is a palladium and magnesium oxide/iron oxide containing catalyst. The test engine in this case was not undergoing misfiring problems and the clear superiority of catalyst H to catalyst G, which contains only palladium metal, is amply demonstrated.

Table VII compares a palladium catalyst, catalyst K, which contains no oxide composite to a palladium/rhodium catalyst, catalyst J, which contains no oxide composite and to a catalyst, catalyst K, made in accordance with the present invention which comprises palladium/rhodium plus magnesium oxide/iron oxide as the oxide composite.

The following data, in Table VIII, shows the results obtained in comparing other embodiments of the invention which the prior art composition of Catalyst Y, under the evaluating conditions described above. It should be noted that Catalyst O utilizes the mineral ilmenite as the oxide composite and that Catalyst W (FeO.MnO.TiO$_2$ as the oxide composite) contains an extraneous component, MnO, in the oxide composite. (The ilmenite is similar in that it may also contain (much smaller proportions) of manganese, as well as other elements normally found in the mineral.)

TABLE VIII

| A/F Ratio Units | −.2 | | | −.1 | | | 0 | | | +.1 | | | +.2 | | |
|---|---|---|---|---|---|---|---|---|---|---|---|---|---|---|---|
| Catalyst | HC | CO | NO | HC | CO | NO | HC | CO | NO | HC | CO | NO | HC | CO | NO |
| L | 58 | 50 | 84 | 72 | 66 | 85 | 82 | 95 | 90 | 93 | 99 | 75 | 95 | 99 | 64 |
| M | 64 | 52 | 92 | 73 | 70 | 93 | 83 | 93 | 95 | 92 | 99 | 75 | 95 | 99 | 65 |
| N | 64 | 49 | 91 | 73 | 66 | 92 | 82 | 85 | 92 | 90 | 99 | 77 | 94 | 99 | 65 |
| O | 64 | 50 | 90 | 74 | 66 | 90 | 83 | 95 | 92 | 92 | 99 | 77 | 94 | 99 | 66 |
| P | 60 | 49 | 90 | 71 | 68 | 91 | 82 | 96 | 96 | 95 | 99 | 75 | 95 | 99 | 66 |
| Q | 79 | 53 | 95 | 88 | 75 | 95 | 93 | 89 | 90 | 94 | 97 | 80 | 95 | 98 | 70 |
| R | 64 | 48 | 90 | 73 | 65 | 90 | 83 | 89 | 91 | 90 | 98 | 75 | 94 | 99 | 64 |
| S | 67 | 52 | 87 | 77 | 67 | 82 | 82 | 80 | 77 | 86 | 90 | 68 | 88 | 94 | 62 |
| T | 68 | 53 | 85 | 78 | 66 | 82 | 82 | 83 | 81 | 87 | 92 | 71 | 90 | 97 | 62 |
| U | 63 | 47 | 84 | 73 | 67 | 82 | 82 | 87 | 82 | 87 | 94 | 70 | 90 | 97 | 62 |
| V | 57 | 50 | 86 | 72 | 68 | 88 | 83 | 94 | 91 | 90 | 98 | 70 | 92 | 99 | 62 |
| W | 71 | 55 | 90 | 78 | 70 | 86 | 85 | 85 | 82 | 89 | 94 | 72 | 91 | 98 | 64 |
| X | 63 | 48 | 85 | 72 | 67 | 85 | 81 | 88 | 85 | 88 | 97 | 72 | 91 | 98 | 63 |
| Y | 78 | 50 | 88 | 83 | 59 | 80 | 86 | 67 | 73 | 87 | 73 | 68 | 89 | 83 | 63 |

As the above data amply demonstrates, the novel platinum group metal-oxide composite-refractory metal oxide support catalyst in accordance with the invention provides an effective catalyst, well suited for so-called three way conversion uses. However, catalyst compositions in accordance with the present invention would be useful for use generally to catalyze oxidation, reduction or oxidation-reduction reactions.

While the invention has been described in detail with respect to certain preferred embodiments thereof, it will be apparent that numerous modifications and alterations may be made to the disclosed preferred embodiments which are nonetheless within the spirit and scope of the invention.

What is claimed is:

1. A catalyst composition comprising a carrier on which are carried:
    (a) a refractory metal oxide support;
    (b) a catalytically effective amount of a platinum group metal component; and
    (c) a catalytically enhancing amount of an oxide composite comprising at least one of magnesium ferrite, calcium ferrite, strontium ferrite, and barium ferrite.

2. The catalyst composition of claim 1 wherein said platinum group metal component comprises from about 0.05 to 1.0 weight percent of said catalyst composition and said oxide composite comprises from about 1 to 20 weight percent of said catalyst composition.

3. The catalyst composition of claim 2 wherein said refractory metal oxide support is on a monolith carrier and comprises from about 0.2 to 25 percent by weight of said catalyst composition.

4. The catalyst composition of claim 1 wherein said platinum group metal component comprises at least one of platinum, palladium and rhodium.

5. The catalyst composition of claim 1 which comprises:
    (a) an alumina support;
    (b) a catalytically effective amount of a platinum group metal component comprising one or more of platinum, rhodium and palladium; and
    (c) a catalytically enchancing amount of an oxide composite comprising at least one of magnesium ferrite, calcium ferrite, strontium ferrite, and barium ferrite, and
    (d) a carrier on which said support, said platinum group metal component and said base metal component are carried.

6. The catalyst composition of claim 5 wherein said platinum group metal component comprises from about 0.05 to 1.0 weight percent of said catalyst composition, said oxide composite comprises from about 1 to 20 weight percent of said catalyst composition and said alumina comprises from about 0.2 to 25 percent by weight of said catalyst composition.

7. A method of manufacturing the catalyst composition of claim 1 having a platinum group metal component, an oxide composite, a refractory metal oxide support, and a carrier which comprises the steps of:
  (a) contacting said support with a liquid in which at least one platinum group metal compound is dispersed to impregnate said support with said platinum group metal compound;
  (b) combining with said support a finely divided particulate oxide composite of at least one of magnesium ferrite, calcium ferrite, strontium ferrite, and barium ferrite;
  (c) depositing said support, said platinum group metal component and said oxide composite onto a carrier; and
  (d) heating the platinum group metal compound-impregnated support sufficiently to convert said platinum group metal compound to said platinum group metal component.

8. The method of claim 7 including said finely divided particulate oxide composite with said support and depositing said oxide composite and said support on said carrier, and thereafter impregnating said support on said carrier with said platinum group metal compound.

9. The method of claim 1 wherein said oxide composite is added to the combined support and liquid, and the resulting combination of platinum group metal compound-impregnated support and oxide composite is deposited upon said carrier.

10. The method of claim 7 wherein said step of converting said platinum group metal compound to said platinum group metal component comprises heating the impregnated support sufficiently to decompose said platinum group metal compound to the elemental metal or metal oxide form.

11. The method of claim 7 wherein said oxide composite is in solid form throughout the manufacture of said catalyst composition.

12. The method of claim 7 wherein said platinum group metal compound includes at least one of a compound of platinum, a compound of palladium and a compound of rhodium.

13. The method of claim 7 including the step of heating said support, said platinum group metal component and said oxide composite deposited upon the carrier.

14. The method of claim 13 including carrying out said heating step at a temperature of about 250° C. to 950° C.

15. The method of claim 7 wherein said metal oxide support is alumina.

* * * * *